US010075541B2

(12) United States Patent
Layson

(10) Patent No.: US 10,075,541 B2
(45) Date of Patent: Sep. 11, 2018

(54) RELEASED OFFENDER GEOSPATIAL LOCATION INFORMATION USER APPLICATION

(71) Applicant: 3M INNOVATIVE PROPERTIES COMPANY, St. Paul, MN (US)

(72) Inventor: Hoyt M. Layson, Orlando, FL (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/368,322

(22) PCT Filed: Jan. 4, 2013

(86) PCT No.: PCT/US2013/020238
§ 371 (c)(1),
(2) Date: Jun. 24, 2014

(87) PCT Pub. No.: WO2013/103779
PCT Pub. Date: Jul. 11, 2013

(65) Prior Publication Data
US 2014/0344404 A1    Nov. 20, 2014

Related U.S. Application Data

(60) Provisional application No. 61/584,081, filed on Jan. 6, 2012.

(51) Int. Cl.
*G06F 15/16* (2006.01)
*H04L 29/08* (2006.01)
(Continued)

(52) U.S. Cl.
CPC ............ *H04L 67/18* (2013.01); *G06F 3/0484* (2013.01); *G08B 21/0269* (2013.01); *G08B 21/22* (2013.01)

(58) Field of Classification Search
CPC ... G06F 3/0484; G08B 21/0269; G08B 21/22; H04L 67/18
(Continued)

(56) References Cited

U.S. PATENT DOCUMENTS 5,787,150 A * 7/1998 Reiman ................. H04M 3/533
379/114.21
5,982,281 A * 11/1999 Layson, Jr. ........ G07C 9/00103
340/539.13
(Continued)

FOREIGN PATENT DOCUMENTS

| WO | WO 2008-027948 | 3/2008 |
| WO | WO 2013-103776 | 7/2013 |
| WO | WO 2013-103782 | 7/2013 |

OTHER PUBLICATIONS

Oppen and Dalal, "The Clearinghouse:A decentralized Agent for Locating Named objects in a Distributed Environment", ACM Transactions on Office Information Systems, val. 1, No. 3, Jul. 1983, pp. 230-253.
(Continued)

*Primary Examiner* — Normin Abedin
(74) *Attorney, Agent, or Firm* — Soroker Agmon Nordman

(57) ABSTRACT

An application for a mobile or fixed device, where the device comprises a processor, a display, and communication capabilities, and wherein the application interfaces with a clearinghouse that integrates geospatial information including date and time information related to released criminal offenders. In some embodiments, the application includes a user interface which includes a field through which a user can submit a query.

26 Claims, 5 Drawing Sheets

(51) Int. Cl.
 *G08B 21/02* (2006.01)
 *G08B 21/22* (2006.01)
 *G06F 3/0484* (2013.01)

(58) Field of Classification Search
 USPC ......................................................... 709/217
 See application file for complete search history.

(56) References Cited

U.S. PATENT DOCUMENTS

| | | | |
|---|---|---|---|
| 6,031,460 A | 2/2000 | Banks | |
| 6,054,928 A | 4/2000 | Lemelson | |
| 6,405,213 B1* | 6/2002 | Layson | G06Q 10/10 |
| | | | 340/539.1 |
| 7,123,141 B2* | 10/2006 | Contestabile | G08B 21/0269 |
| | | | 340/539.1 |
| 7,162,237 B1 | 1/2007 | Silver | |
| 7,298,835 B1 | 11/2007 | Perry | |
| 7,561,065 B2 | 7/2009 | Obradovich | |
| 7,565,157 B1 | 7/2009 | Ortega | |
| 7,577,666 B2 | 8/2009 | Overton | |
| 7,589,628 B1 | 9/2009 | Brady, Jr. | |
| 7,598,855 B2 | 10/2009 | Scalisi | |
| 7,599,795 B1 | 10/2009 | Blumberg | |
| 7,602,277 B1 | 10/2009 | Daly | |
| 7,611,409 B2 | 11/2009 | Muir | |
| 7,616,942 B2 | 11/2009 | Karl | |
| 7,619,533 B2 | 11/2009 | Crucilla | |
| 7,646,296 B2 | 1/2010 | Ohki | |
| 7,647,022 B2 | 1/2010 | Ng | |
| 7,647,047 B2 | 1/2010 | Moghaddam | |
| 7,936,262 B2 | 5/2011 | Derrick | |
| 7,961,092 B2 | 6/2011 | Freathy | |
| 8,009,036 B2 | 8/2011 | Freathy | |
| 8,169,316 B2 | 5/2012 | Freathy | |
| 8,451,131 B2* | 5/2013 | Ghazarian | G08B 21/0269 |
| | | | 340/539.11 |
| 2002/0164979 A1 | 11/2002 | Mooney | |
| 2004/0113772 A1 | 6/2004 | Hong Chou | |
| 2005/0040944 A1* | 2/2005 | Contestabile | G08B 21/0269 |
| | | | 340/539.13 |
| 2005/0216555 A1* | 9/2005 | English | G06Q 50/18 |
| | | | 709/204 |
| 2005/0232249 A1 | 10/2005 | Mishra | |
| 2005/0285747 A1 | 12/2005 | Kozlay | |
| 2006/0055561 A1* | 3/2006 | Kamali | G08G 1/052 |
| | | | 340/936 |
| 2006/0183486 A1 | 8/2006 | Mullen | |
| 2007/0159343 A1 | 7/2007 | Crucilla | |
| 2007/0182544 A1 | 8/2007 | Benson | |
| 2008/0043932 A1* | 2/2008 | Elliott | H04M 11/04 |
| | | | 379/37 |
| 2008/0103293 A1 | 5/2008 | Cho | |
| 2008/0215627 A1 | 9/2008 | Higgins | |
| 2010/0317317 A1 | 12/2010 | Maier | |
| 2011/0201274 A1 | 8/2011 | Freathy | |
| 2011/0248853 A1 | 10/2011 | Roper | |
| 2013/0317317 A1 | 11/2013 | Ellsworth | |

OTHER PUBLICATIONS

International Search Report for PCT International Application No. PCT/US2013/020238, dated Apr. 9, 2013, 3 pages.

* cited by examiner

RELEASED OFFENDER GEOSPATIAL LOCATION INFORMATION USER APPLICATION

TECHNICAL FIELD

This disclosure relates to a user application for a device that interfaces with a clearinghouse, where the clearinghouse integrates geospatial information including date and time information related to released criminal offenders.

BACKGROUND

Today, released criminal offenders on community supervision, either probation or parole, are monitored by a criminal justice supervising agency, such as a department of corrections or local law enforcement. The monitoring is based on a sentence, and often includes exclusion areas and inclusion areas with a schedule for the day of the week and a range of times associated with those areas when the released criminal offender is required to be or required not to be in those areas. A released criminal offender's geospatial location at a given date and time is monitored and recorded by tracking devices worn by the released criminal offender. This geospatial information, including date and time information, can be used to determine a released criminal offender's compliance with their sentence. Activities of released criminal offenders can be reported to the criminal justice supervising agency or to a probation or parole officer by fax, page, text message or email generated by a monitoring center unique to the criminal justice supervising agency.

Currently, an offender's geospatial location and associated date and time information can be determined by a number of different methods. These methods range from: (1) voice verification whereby an offender calls in by land line to verify his current geospatial location at a given date and time by using caller ID for a wired line phone, (2) radio frequency monitoring whereby the supervised released criminal offender wears a tamper resistant tag that communicates with receivers at a known geospatial location or geospatial locations using short range (i.e. in the range of 100 meters) radio frequency communications, to (3) tamper resistant tracking devices that record or report geospatial location points along with date and time information either in a batch mode or real time mode using a geospatial location, date and time means such as GPS, cellular triangulation, IP (Internet Protocol) address and/or a wired telephone land line caller ID for batch mode, or wireless communications for bath real time and batch modes.

Just as multiple systems are used to determine a released criminal offender's geospatial location at a given date and time, multiple databases exist containing released criminal offender geospatial location information along with date and time information. These databases are owned or operated by contracted companies providing released criminal offender monitoring products and services. Or the criminal justice supervising agency may deploy and operate released offender monitoring and reporting devices produced by vendors. These databases are disparate in terms of their physical location, operation and reporting mechanisms. These databases are heterogeneous in terms of data format since there is no formatting standard for the data collected or stored for supervised released criminal offenders, and there are multiple vendors providing products and services to monitor or locate supervised released criminal offenders. Within a single jurisdiction as small as a city or county, there may be one or more of each type of system described above, each with their own separate unique databases and unique reporting implementations. Disparate systems also do not share geospatial location information along with date and time information with each other. A system which reports supervised released criminal offender's geospatial location, date, and time information and movement history to only one of multiple agencies that may benefit from or need such information is known in the art as a stovepipe system.

Further, released offenders can cause potential threats to community safety due to high recidivism rates among particular types of offenders, Released offenders may currently be required to register their current address with a criminal justice or law enforcement agency. While the addresses for certain released offenders are frequently available online, the addresses are not always up to date, and even if they are, only provide information to a community member about the released offender's current residence, but not their current location, tendencies to loiter in other locations, or proximity to a potential or past victim. There exists a need for an improved method of monitoring released criminal offenders.

SUMMARY

Stovepipe systems of the status quo can be limiting when sentences for supervised released criminal offenders are general guidelines that are wide in their scope and cross over into adjacent criminal justice supervising agencies' territories or jurisdictions. This wide scope and geographic range makes it extremely difficult to detect a violation of the supervised released criminal offender's sentence outside of the supervising agency's jurisdiction, much less enforce the sentence.

As an example, supervised released criminal offenders are often not allowed to be with or within a defined proximity of other supervised released criminal offenders. This sentence only be can be monitored and enforced if geospatial location information along with date and time information for two or more supervised released criminal offenders is collected and managed by a single system, so that the system can correlate the locations of the two released criminal offenders at any time, whether in real time or post mortem. This sentence cannot be monitored and is not enforceable if two or more supervised released criminal offender who come into contact with each other being monitored by different or disparate systems that do not share geospatial location and date and time information about each of the released criminal offenders with each other. A central repository, or clearinghouse, or central repository of supervised released criminal offender geospatial location, date and time data is required to monitor and enforce this particular type of sentence and other sentences that include multiple areas monitored hy disparate systems.

Another example relates to predatory offenders such as stalkers, rapists and pedophiles that stalk their victims in order to determine the optimum time and location to perform their predatory crime. Because these supervised released criminal offenders have had and may have sentences preventing association with particular individuals who are potential victims, it is currently impossible to define possible off limit locations for such a sentence. It is even more impossible to monitor and enforce all locations since the off limit locations are enormous in number and the off limit areas are both static and dynamic. For example, a common sentence for pedophiles is that they are not allowed to loiter or sometimes go to locations where children are present or congregate. Knowing the location of the potential victims in this example is required to assure violation detection and enforcement of such a sentence. Currently, only generally known static locations such as schools and playgrounds can be identified, monitored and enforced as exclusion areas for pedophiles. Dynamic areas such as school bus stops cannot be programmed into monitoring systems and devices for supervised released criminal offender because they change each school year.

The result of the disparate systems, the lack of data formatting standards, fragmented reporting and the dynamics of victim and crime opportunity scenarios combine to result in an increased risk to public safety. Further, dynamic exclusion locations and the plurality of static exclusion locations that are unknown to criminal justice supervising agencies make it difficult to effectively monitor supervised released criminal offenders or enforce sentences.

The present invention provides many advantages over the status quo to address many of the limitations of the status quo addressed above. These advantages include data fusion for the supervising authorities of supervised released criminal offenders under community supervision. The present invention also allows collection of geospatial location information, including date and time information, from subscribers to identify dynamic exclusion areas for supervised released criminal offenders. The present invention further allows a subscriber using a mobile device to use an application that interfaces to the clearinghouse and to submit queries through the user interface.

Additionally, the clearinghouse utilizes a heretofore unavailable method to obtain the date stamped and time stamped geospatial location data of the subscriber who is either a victim or a potential victim to: (1) better monitor and enforce criminal justice sentencing guidelines, (2) better perform trend analysis for predicting criminal activity, and (3) utilize heretofore unavailable increased observation data from subscribers for preventing criminal activity.

Each of these advantages can result in improving public safety by the following items: (1) notifying subscribers to the clearinghouse of the proximity of supervised released criminal offenders, where such notification can occur through an application on a mobile or fixed device, (2) submitting proximity intelligence reports to the criminal justice supervising agency, (3) performing trend analysis and generating potential criminal activity intelligence reports to the criminal justice supervising agency, (4) dispatching law enforcement to apprehend and detain supervised released criminal offenders identified as a threat by potentially stalking victims or surveying criminal opportunities and (5) dynamically establishing new off limit locations for sentencing guidelines further restricting supervised released criminal offenders from non compliance regarding sentencing guidelines, increasing the scope of monitoring and increasing the scope of enforcement.

The present invention includes an application for a mobile or fixed device, the device comprising a processor, a display, and communication capabilities, wherein the application interfaces with a clearinghouse that integrates geospatial information including date and time information related to released criminal offenders.

In some embodiments, the application comprises a user interface, wherein the interface includes a field through which a user can submit a query.

In some embodiments, the user interface is a law enforcement interface.

In some embodiments, the user interface is a subscriber interface.

In some embodiments, the application further interfaces with an emergency dispatch center.

In some embodiments, the emergency dispatch center is an E911 dispatch center.

In some embodiments, the application comprises a user interface that allows a user to communicate with a live chat operator.

In some embodiments, a user can subscribe to receive regular updates or notifications from the clearinghouse.

In some embodiments, a user can submit a query to the clearinghouse based on the location of the user.

In some embodiments, the location of the user is automatically provided to the clearinghouse by the device.

In some embodiments, the query requests information related to released criminal offenders within a given proximity of the user or within a given proximity of a selected location.

In some embodiments, the user can request additional information about a released criminal offender within the given proximity.

In some embodiments, the additional information can include at least one of: demographic information, sentencing guideline information, location trend information, and domicile information.

In some embodiments, the additional information includes a movement history for the criminal offender over a range of dates or times.

In some embodiments, the user can request additional information by selecting an icon representing a released criminal offender and shown on a map on the device.

In some embodiments, a user can submit a panic alert associated with one of the released criminal offenders.

In some embodiments, the application sends the panic alert to one of: a criminal justice agency, a law enforcement facility, a live chat operator, and an emergency dispatch operator.

In some embodiments, the application is configured to provide the user with location and contact information for the closest law enforcement facility.

In some embodiments, a user can submit a panic alert.

In some embodiments, the application submits demographic or geospatial location, including date and time information to the clearinghouse when the user submits the panic alert.

In some embodiments, the clearinghouse is configured to send the information to a law enforcement agency.

In some embodiments, the panic alert is sent to a law enforcement agency.

In some embodiments, the application is configured to receive a confirmation number from the law enforcement agency.

In some embodiments, the law enforcement agency is automatically connected to the device based on the panic alert.

In some embodiments, a law enforcement agency is automatically connected to the device based on a criminal activity trend analysis generated by the clearinghouse or based on a subscriber threat assessment generated by the clearinghouse.

In some embodiments, the application can communicate with an emergency dispatch center.

In some embodiments, the emergency dispatch center is an E911 dispatch.

In some embodiments, the application can interface with the clearinghouse to send the emergency dispatch center demographic and geospatial location/date/time information about the user.

In some embodiments, the application can interface with the clearinghouse to send the emergency dispatch center demographic and geospatial location/date/time info: illation about a release criminal offender.

In some embodiments, the application can receive a confirmation number from the emergency dispatch center response to the user sending a panic alert.

In some embodiments, the emergency dispatch center is automatically connected to the device based on a panic alert, based on a criminal activity trend analysis generated by the clearinghouse or based on a subscriber threat assessment generated by the clearinghouse.

In some embodiments, a criminal justice agency is provided with demographic and geospatial location information, including date and time information, about the user when the user sends a panic alert to the central clearinghouse.

In some embodiments, a criminal justice agency is provided with demographic and geospatial location information, including date and time information, about an associated released criminal offender when the user sends a panic alert to the central clearinghouse.

In some embodiments, the application receives a confirmation number from a criminal justice agency in response to the user sending a panic alert to the central clearinghouse.

In some embodiments, a criminal justice agency is automatically connected to the device based on a panic alert, based on a criminal activity trend analysis generated by the clearinghouse or based on a subscriber threat assessment generated by the clearinghouse.

In some embodiments, a live chat operator is provided with demographic and geospatial location information including date and time information about the user when the user sends a panic alert to the central clearinghouse.

In some embodiments, a live chat operator is provided with demographic and geospatial location information including date and time information about an associated released criminal offender when the user sends a panic alert to the central clearinghouse.

In some embodiments, the application can receive a confirmation number from a live chat operator in response to the user sending a panic alert.

In some embodiments, a live chat operator is automatically connected to the device based on a panic alert, based on a criminal activity trend analysis generated by the clearinghouse or based on a subscriber threat assessment generated by the clearinghouse.

In some embodiments, a live chat operator can respond to a user panic alert by starting a live chat session with the user.

While various features are summarized above, the features are designed to be combined with each other in any technically feasible way to create a variety of embodiments of the present invention.

BRIEF DESCRIPTION OF DRAWINGS

For a more complete understanding of the present disclosure and its advantages, reference is now made to the following description, taken in conjunction with the accompanying drawings, in which.

The accompanying drawings illustrate various embodiments of the present invention. The embodiments may be utilized, and structural changes may be made, without departing from the scope of the present invention. The figures are not necessarily to scale. Like numbers used in the figures generally refer to like components. However, the use of a number to refer to a component in a given figure is not intended to limit the component in another figure labeled with the same number.

DETAILED DESCRIPTION

Figure 1:
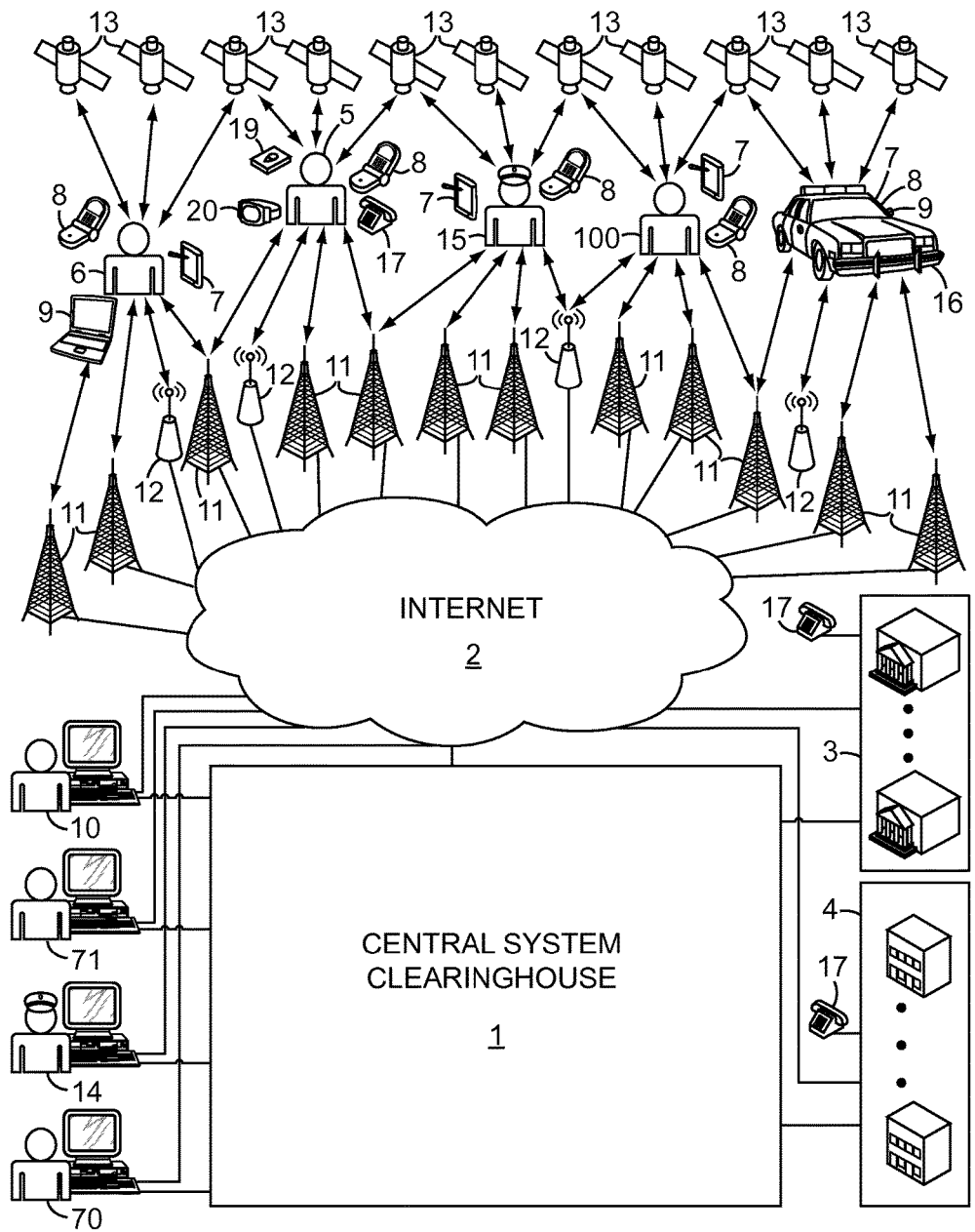
FIG. 1 is a diagram illustrating an exemplary end to end system, including a clearinghouse interfaced to different types of disparate monitoring and data collection systems, and the users of the data produced by the clearinghouse.

FIG. 1 depicts an exemplary end to end system including clearinghouse 1, devices, and people clearinghouse 1 can interface with in such a system. In the illustrated embodiment, clearinghouse 1 is interfaced to people and devices by the internet 2. Further connectivity to the clearinghouse 1 for subscribers 6, probation and parole officers 100 and law enforcement officers 15, 16 using devices 7, 8, 9 is provided by direct connections, wireless cellular 11 or Wifi or WiMax 12 networks using the Internet 2.

A subscriber 6 can be any individual or entity who is not a supervised released criminal offender. This can include past victims, potential victims, law enforcement personnel and others. Subscribers 6 can also have different levels of interaction with clearinghouse 1. For example, subscribers 6 may be an active part of the clearinghouse 1 system. A subscriber 6 may have a device that regularly interacts with clearinghouse 1 by regularly sending location information to clearinghouse 1 so that clearinghouse 1 actively tracks subscriber 6. Subscriber receive automated push notifications based on particular criteria, subscriber preferences, released criminal offender trend analysis and released criminal offender threat assessment. For example, a subscriber 6 may receive a push notification when subscriber 6 is within a given, predetermined distance of a released criminal offender 5. On the other hand, a subscriber 6 may also interact with the clearinghouse 1 only on a demand or passive, basis. Such a subscriber 6 is a recipient. A recipient typically plays a more passive role when interacting with clearinghouse 1. A recipient may use a device to make queries to the clearinghouse and is able to submit further information related to a released criminal offender 5 identified by the clearinghouse in a response to the recipient's query. The recipient may also provide location information to clearinghouse 1. In some cases, based on released criminal offender 5 trend analysis and thread assessment, clearinghouse 1 may push a notification to a recipient based on the recipient's cumulative queries demonstrating a trend or threat level assessment by a released criminal offender, but clearinghouse 1 will typically not actively track the location of a recipient. There can be other types of subscribers 6 with varying ranges of interaction with clearinghouse 1, but the term subscriber 6 is used generically to describe these individuals.

Direct connections to clearinghouse 1 can be provided for monitoring equipment at supervising agencies 3, monitoring equipment at contracted companies 4, probation and parole officers at supervising agencies 10, law enforcement 14, E911 dispatch 70 and chat operators 71 by connections such as leased lines, x.25, frame relay, etc. Any of the entities above may also be connected to clearinghouse 1 via the interact 2. Any appropriate connection method or protocol for any of the entities or individuals mentioned above may be used in accordance with the scope of the present disclosure.

Currently, criminal justice supervising agencies 3 and contracted companies 4 that monitor a released criminal offender 5 use a variety of tools or devices to determine a released criminal offender's location. Such devices include, for example, land line telephones 17, cellular phones 18, pagers 19, and offender-worn devices 20. These devices use various methods to determine geospatial location at a given date and time. Some devices use wireless 11 triangulation, WiFi 12, IP address, caller ID or satellite 13 triangulation. Some devices are hand carried and some devices are body worn. Some devices provide continuous geospatial location information in real time by using wireless communications while some devices record continuous geospatial information, along with date and time information, and then submit it in a hatch mode either wireless or land line communications to clearinghouse 1.

In accordance to the present disclosure, geospatial location information along with date and time information collected by a criminal justice supervising agency 3 or a contracted company 4 are transferred to clearinghouse 1 through the applicable communication link.

Because geospatial location info: illation, along with date and time information, is provided by many different sources, it exists in many heterogeneous formats. When clearinghouse 1 receives the heterogeneous data, a computer system of clearinghouse 1 can convert the data to a homogenous data format. For example, the heterogeneous data can be encapsulated and made homogenous using the capabilities of extended markup language (XML). Other methods and systems for making data homogenous are discussed elsewhere in this disclosure and will be apparent to one of skill in the art upon reading this disclosure. XML may also be utilized for communication between clearinghouse 1 and systems of criminal justice supervising agencies 3 and contracting companies 4. Any other appropriate method of converting the data to a homogenous format may also be used.

Other entities, such as law enforcement vehicles 16 and officers 15 may have systems for identifying or recording geospatial location along with date and time information systems which can also be interfaced to clearinghouse 1. This allows law enforcement vehicles 16 and officers 15 to be located for supervised released criminal offender 5 apprehension and detention for violations of sentences, panic responses from subscribers 6 and threat warnings generated for subscribers 6.

In the illustrated embodiment, clearinghouse 1 can receive queries from subscribers' 6 devices, such as personal digital assistant (PDA) 7, cellular phone 8, laptop computer 9 or other devices that have the ability to provide a location for subscriber 6 as described herein. For example, any of PDA 7, cellular phone 8, laptop computer 9, or other devices with subscriber 6 may have an application that allows the subscriber 6 to send their date stamped and time stamped geospatial location information and demographic data to the clearinghouse 1 either by wireless or wired means. Additional devices that may be used by the subscriber 6 include smart phones, palmtop computers and desk top computers, any of which may allow the subscriber to provide location information, along with date and time information to clearinghouse 1. These devices may communicate with clearinghouse 1, for example, through a Local Area Network (LAN), Integrated Services Digital Network (ISDN), cable or telephone modern Geospatial location of the subscriber 6 along with date and time information can either be sent as a result of the subscriber 6 query or can be sent continuously by an application in the subscriber's 6 wireless device or by any device that can be attached by wired network or phone line. The geospatial location along with date and time information of the subscriber 6 can be determined by the subscriber's 6 device using GPS, cellular triangulation or other geospatial location, date and time locating methods. Wired or wireless networks 11 can also provide the geospatial location information, along with date and time information of the subscriber's device.

An application on the subscriber's 6 mobile or wireless device can allow the subscriber 6 to provide additional information, such as narrative information, about the subscriber's 6 current geospatial at a given date and time. For example, a school bus stop or places where children gather are typically off limits for pedophiles. Such locations tend to be dynamic over time such that they are unknown to supervising agencies 10 when those agencies establish off limit areas or exclusion zones in the monitoring systems of a criminal justice supervising agency 3 or contracted company 4 and offender monitoring devices such as land line telephones 17, cellular phones 18, pagers 19, and offender-worn devices 20. By receiving such information from subscribers 6, supervising agencies 10 can dynamically update off limit areas or exclusion zones for pedophiles in either the criminal justice supervising agency 3 or contracted company 4 systems and/or clearinghouse 1. Further, by allowing subscribers 6 to enter dynamic locations with a narrative description, and submit the information to supervising agencies 10 via the clearinghouse 1, the supervising agency 10 can evaluate these locations and better monitor and enforce sentences. The supervising agency can continuously update off limit areas in criminal justice supervising agency 3 or contracted company 4 monitoring systems and in the supervised released criminal offender's 5 devices.

Subscriber 6 can then be notified if there is a released criminal offender 5 within a predefined proximity or distance range and time interval entered by the subscriber 6. Subscriber 6 can receive such a notification in a timely fashion for those supervised released criminal offenders 5 that have continuous wireless reporting devices. For supervised released criminal offenders 5 with batch reporting devices, a message either by text or email can be sent to the subscriber 6 as soon as the date stamped and time stamped geospatial location information for a released criminal offender 5 matching the subscriber's 6 prior query is subsequently identified by the clearinghouse 1 when the supervised released criminal offender's 5 data arrives at clearinghouse 1. Whenever the clearinghouse 1 notifies the subscriber 6 through a report, clearinghouse 1 can also report the same, less, or more extensive information to the supervising agency 10. Clearinghouse 1 can also log the occurrence(s) in a data base of clearinghouse 1 with an incident identifier for ongoing or subsequent trend analysis and evaluation by the criminal justice supervising agency 10, clearinghouse 1, or any other appropriate entity with access to the necessary data, such as incident identifiers.

An application consistent with the present disclosure can be on any device including a processor, display and communication capabilities, including each of subscriber 6 devices described above. The application can be configured to interface with a clearinghouse 1 consistent with the present disclosure, where the clearinghouse 1 integrates geospatial information, including date and time information related to released criminal offenders.

The application may have multiple user interfaces, which the interfaces are displayed on a device display, where the interface varies depending upon the user accessing the application. For example, the application may have an interface tailored to law enforcement, where the interface allows the user to submit a query regarding current location of a released offender, previous violations of a released offender, movement history of a released offender, and any other particular information a law enforcement agency may require access to.

The user interface may also be configured as the subscriber interface, where the subscriber 6 is either a victim or potential victim. In such configurations, the application may further interface with an emergency dispatch center, such as an E911 center, so that if the subscriber 6 becomes aware of a dangerous situation due to the proximity of a released offender, they can use the application to contact emergency assistance. Further, the user interface may also allow a user to communicate with a live chat operator.

The user interface may have features that allow the subscriber 6 to request and receive regular updates or notifications from the clearinghouse. The updates or notifications can be based on proximity of the user to a released offender, or on any other appropriate parameters. The user can submit a general query to the clearinghouse based on the location of the user. More specific functionalities of a user interface are described below with respect to FIGS. 3 and 4.

In one embodiment, when clearinghouse 1 identifies a trend of stalking behavior by a released criminal offender 5, clearinghouse 1 may report the trend or a potential violation to subscriber 6, criminal justice supervising agency 10, probation and parole officers 100 and/or law enforcement 14. Either the criminal justice supervising agency 10, probation and parole officers 100, law enforcement 14 or clearinghouse 1 can send information to law enforcement officers 15 or law enforcement vehicles 16 near the current geospatial location of subscriber 6. The information can also be sent to live chat operators 71 and E911 dispatch 70. Law enforcement vehicles 16 may have one or more wireless devices which clearinghouse 1 can use for collecting law enforcement officer 15 or vehicle 16 geospatial location information, including date and time information, and for sending information, Clearinghouse 1 also sends a warning to a wired or wireless device with the subscriber 6. Subscriber 6 can also subscribe to continuous updates and be notified whenever a released criminal offender 5 is in the area or within a predefined proximity of subscriber 6.

Figure 2:
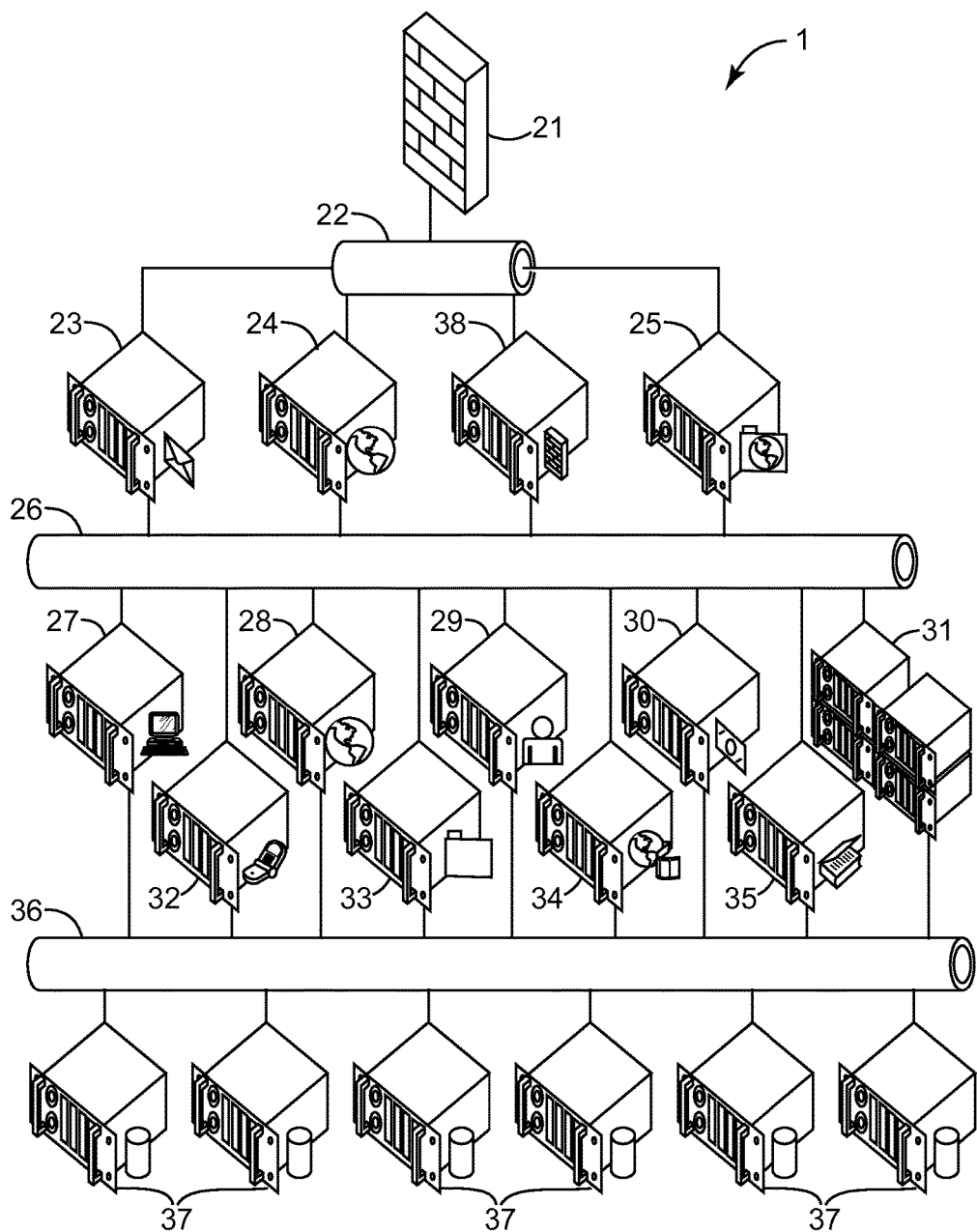
FIG. 2 is a diagram illustrating an exemplary computer architecture for a clearinghouse.

FIG. 2 depicts an exemplary computer architecture for a clearinghouse including a detailed architecture of tiered service components in a traditional Service Oriented Architecture (SOA) implementing end to end transactions as threads of services. While FIG. 2 shows a particular configuration for server architecture, any appropriate configuration consistent with the scope of the present disclosure can be used to construct a server architecture for clearinghouse 1. In the illustrated embodiment, clearinghouse 1 provides Software as a Service (SaaS) as known in the art for cloud computing. Although FIG. 2 depicts all of the server components in one location, the architecture can be distributed, clustered and federated across the internet. Distributed server architectures provide availability should a portion of the internet or a server location suffer congestion or an infrastructure outage. Clustered server architectures can provide availability, manageability and scalability. Federated server architectures provide allows processing load to be shared and partitioned amongst multiple servers thereby increasing throughput. Therefore the distributed, clustered and federated architecture of the clearinghouse SOA architecture disclosed herein provides the advantages of being scalable, reliable and high performance.

In the illustrated embodiment, the top tier of the clearinghouse 1 architecture interfaces with internet 2 via firewalls 21. Firewalls 21 can be configured in any arrangement known in the art of internet based information processing and e-commerce. Firewalls 21 protect the clearinghouse 1 from such things as denial of service attacks, unauthorized user access and the infusion or injection of viruses as known in the art into the operating systems and applications executing in/on servers behind the firewalls 21.

The first tier sub-network 22 interfaces the servers that provide standard Internet services such as e-mail, websites, device communication gateways and file transfer protocol (FTP). The e-mail servers 23 can provide email services to a variety of entities, including subscribers 6, supervising agencies 10, probation and parole officers 100, law enforcement officers 14, 15 and vehicles 16, E911 dispatch 70, live chat operators 71, e-commerce servers 30 and the application servers 31. Web servers 24 can host the web services that provide the browser services between the application servers 31 and the other components or users of an end to end system such as subscribers 6, supervising agencies 10, probation and parole officers 100, and law enforcement officers 14, 15 and vehicles 16. The FTP servers 25 can provide file transfer services to subscribers 6, supervising agencies 10, law enforcement officers 14, 15 and vehicles 16, E911 dispatch 70, live chat operators 71 and criminal justice supervising agency 3 and contracted company 4 monitoring systems. The gateway servers 38 can provide the advantages of availability, high throughput and assured delivery of data for subscribers 6, supervising agencies 10, probation and parole officers 100, supervising criminal justice agency 3 and contracted company 4 monitoring systems and law enforcement officers 14,15 and vehicles 16 to and from clearinghouse 1. The gateway servers 38 can provide flow control by sending UDP packets with updated lists of gateway server 38 IP addresses to prevent congestion or to rout around gateway outages.

The $2^{nd}$ tier sub-network 26 interfaces any business logic implemented in servers 27, 28, 29, 30, 31, 32, 33, 34, 35 to the web services on the first tier web servers 23, 24, 38 and 25. Management servers 27 manage resources and monitor and control performance for the business logic tier, especially congestion on the real time gateway servers 38. Geospatial information servers 28 provide translation between coordinates of latitude and longitude, postal address layers, map layers and other feature layers for the business logic tier. Real time communication servers 29 provide the services for chat, text messaging, voice, and graphics for the business logic tier, E-commerce servers 30 provide E-commerce services for subscribers 6 supervising agencies 10, probation and parole officers 100, and law enforcement officers 14, 15 and vehicles 16 regarding accounting for the services provided. Application servers 31 provide a plurality of application services for the clearinghouse 1, subscribers 6, supervising agencies 10, probation and parole officers 100, E911 dispatch 70, operator chat 71 and law enforcement officers 14, 15 and vehicles 16, Application servers 31 provide the custom applications that implement the business logic for the clearinghouse 1, Mobile information servers 32 maintain attribute information specific to portable wireless devices, such as PDA 7, cellular phone 8, and laptop computer 9, and format the data for the wireless devices. File servers 33 maintain the application files that are uploaded and downloaded between the components of the end to end system and provide XML services for data format conversion, encoding and decoding. Streaming media servers 34 deliver image data, streaming audio and streaming video content to portable wireless devices and wired devices with law enforcement officers 14, supervising agencies 10, E911 dispatch 70 and live chat operators 71. Directory servers 35 maintain a directory of components, in the end to end system. Temporary variables and service thread attributes for tier 2 servers can be stored locally on the respective servers, thereby not competing for data base servers 37, and additionally providing a stateless architecture eliminating single points of failure for process threads in the servers of the clearinghouse 1. In the illustrated configuration, this is possible because the SOA transactions are data driven, and data loss is unlikely due to assured delivery end to end by acknowledgements at gateway servers 38 and application servers 31. Therefore any unacknowledged or negatively acknowledged service thread is restarted once the TTL (Time To Live) timeout occurs.

The third tier sub-network 36 interfaces the business logic in the second tier to the clustered and federated data base servers 37. The data base servers 37 provide the usual and customary functions of storage, retrieval, updating and archiving of all data in the clearinghouse 1.

Exemplary User Interfaces

Figure 3:
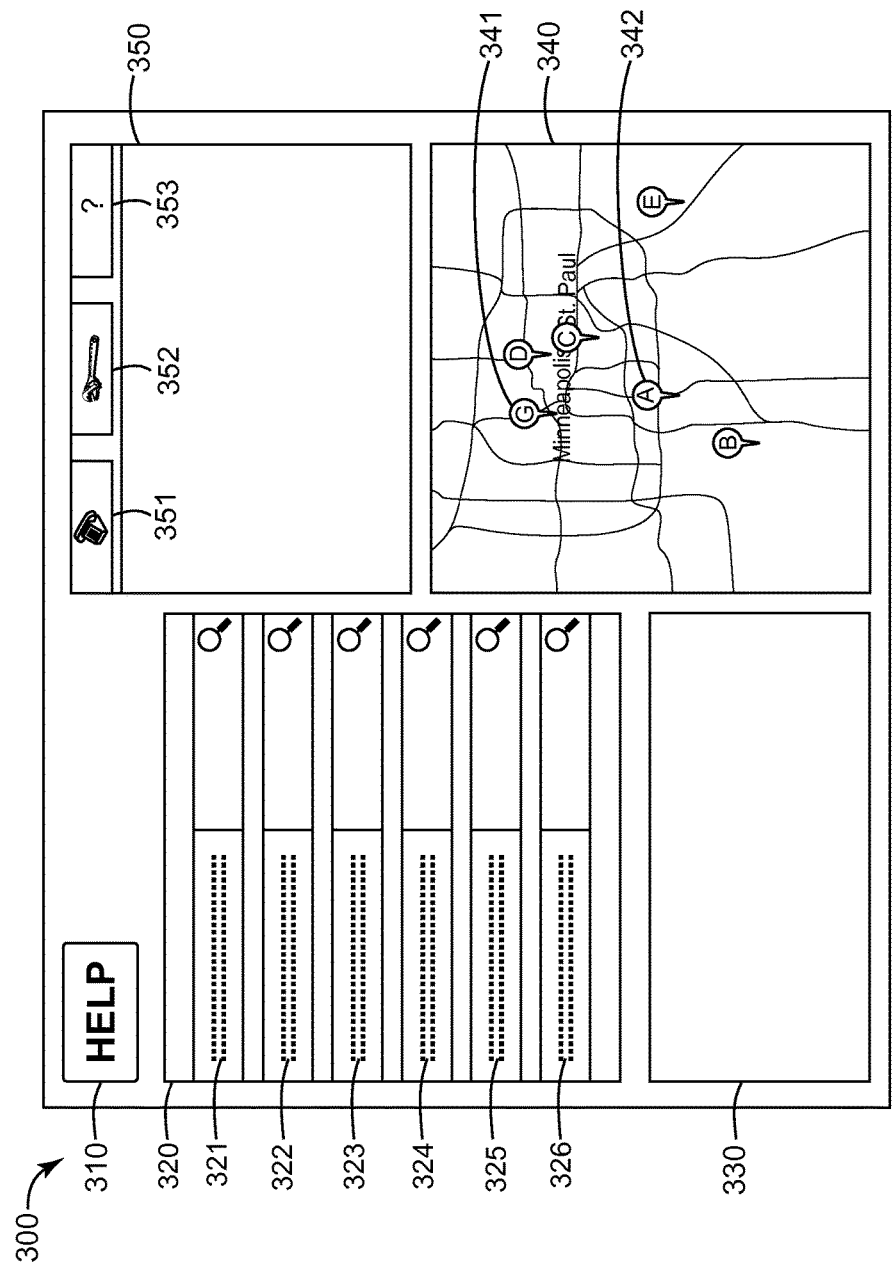
FIG. 3 represents an exemplary subscriber user interface displayed on a subscriber device.
Figure 4:
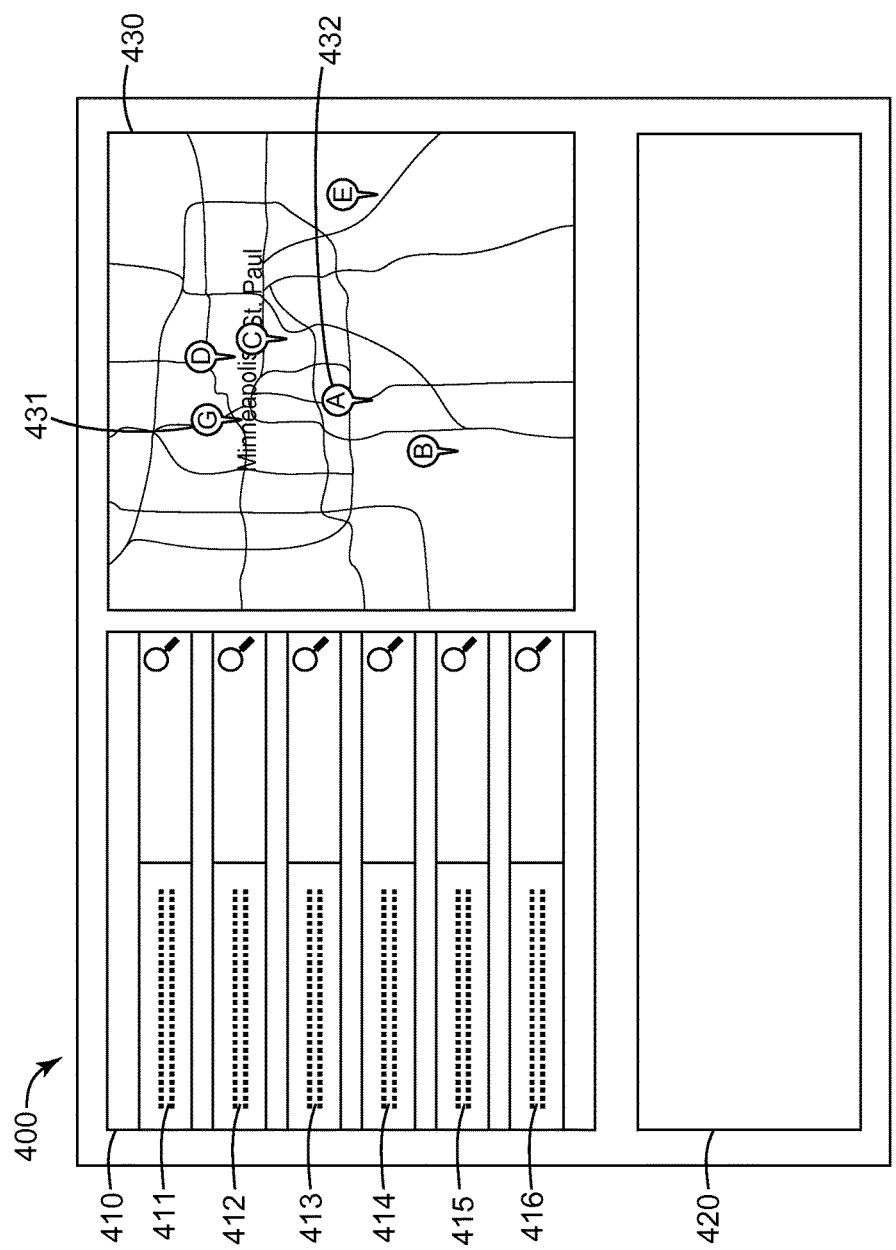
FIG. 4 represents an exemplary law enforcement user interface displayed on a law enforcement device.

FIG. 3 represents an exemplary subscriber 6 user interface 300 displayed on the subscriber device 7, 8, 9. The user interface provides the subscriber 6 or other system user direct interaction with clearinghouse 1 through the various communication pathways as outlined in FIG. 1. The user interface 300 discussed in FIG. 3 is exemplary. A person of skill in the art will recognize layout and design variation such as shifting the position of the overlap map 340, placement of the chat window 350, or user query request fields 321-326. Clearinghouse 1 applications residing on the subscriber device 7, 8, 9 as outlined in FIG. 2 permit customization of the subscriber 6 user interface, and content illustrated in FIG. 3 or not illustrated in FIG. 3 may be added or deleted. Further, a user interface 300 consistent with the present disclosure may be customized based on the type of user the user interface is designed for. While different interfaces are shown in FIGS. 3 and 4, interfaces may be further customized based on the type of subscriber 6 or law enforcement 14, 15 entity. For example, when a subscriber is a recipient, the features available in user interface 300 may be reduced consistent with the level of access or interaction recipient has with clearinghouse 1.

The subscriber 6 user interface 300 includes a panic response or alert button 310, which directly informs Clearinghouse 1 that subscriber 6 or other system user is in need of assistance. When activated, the panic response or alert button 310 notifies the application servers 31 defined in FIG. 2. The panic response or alert button 310 may be activated as a touch icon on a touch screen or through other input devices connected to the subscriber 6 device 7, 8, 9. As an example, the subscriber 6 may use the mouse or a keystroke on a keyboard connected to a laptop computer 9 to initiate the panic response or alert.

A query request window 320 permits text, based entry into associated fields on the application running on the subscriber device 7, 8, 9. Queries submitted define how Clearinghouse 1 will interact and respond to the subscriber 6 or other system user. The subscriber 6 may use the query request window 320 to query Clearinghouse 1 to determine the current or past location of an offender 5 in relation to the subscriber 6 current location. The subscriber 6 may query Clearinghouse 1 based on subscriber 6 location 321, offender 5 location 322, offender 5 demographic information 323, offender 5 sentencing guidelines 324, and offender 5 location trend information 325. Fields illustrated in the query request user interface 320 or not illustrated may vary and permutations will be apparent to one of skill in the art. The query request window 320 also includes a field where the subscriber 6 may define notifications and alerts 326 to Clearinghouse 1 and how responses should be received. As an example, the subscriber 6 inputs text into the notification and alert field 326 regarding the distance that an offender 5 should be from subscriber 6 before a notification is sent to the subscriber device 7, 8, 9. For example, subscriber 6 may input that when an offender 5 is less than 50 meters from subscriber 6 clearinghouse 1 should generate an email notification to the subscriber 6.

Responses to user generated queries are displayed in a query response window 330 and/or an overlap map 340 on the user interface 300. Definition as to where a response will be displayed may be defined by the subscriber 6 in the notification and alert 326 field of the query request window 320. In the query response window 330, text based messages will be displayed in response to the subscriber 6 query. As an example, the subscriber 6 inputs their current location as Chile, Wis., into the query request field 321 and executes the search on the application. The subscriber 6 may input their location as a city with a state, a zip code, or as GPS coordinates. Clearinghouse 1 would analyze the location, demographic, sentencing guidelines, and trending information of offenders 5 within a predetermined distance of the subscriber 6 location as defined in FIG. 5. Clearinghouse 1 then transmits the information resulting from the query to the subscriber device 7, 8, 9 and the information will be displayed in the query response window 330. Information displayed in the query response window may display the name and gender of the released criminal offender 5, along with other information, such as Joe Smith, Male, 70 kg along with sentencing or trend information including a frequency of how often offender 5 has visited their current location. Information displayed in the query response window 330 may also include a picture of the released criminal offender 5. As an example, trend information may be displayed in the query response window that Joe Smith has frequented his current location in Chile, Wis., three times per day since the first of the month. Clearinghouse 1 responses may also be presented in graphical format as shown in an overlap map 340. Icons 341 representative of subscriber 6 and offender 5 or other systems users will be displayed in the overlap map 340. Additional information about the subscriber 6 or offender 5 will be displayed in call out window 342 when the subscriber 6 selects or moves over the icon 341 on the overlap map 340. Representation of icons and call out windows are exemplary in the user interface 300 and may, assume the shapes of numerous symbols or banners. Variations on the design will be apparent to one of skill in the art upon reading the present disclosure.

The subscriber 6 chat window 350 is also included on the subscriber 6 user interface 300. The chat window 350 enables real-time messaging communication with another system user and more critically E911 Dispatch 70 once activated by the subscriber 6. A connect and disconnect button 351 presented in the chat window 350 will initiate and terminate chat sessions between the subscriber 6 and other system users. Chat window settings can be altered through an options button 352. Chat window settings may include textual alterations or options to select, invite, and add other system users to chat sessions. A help button 353 will also be provided that provides assistance and explanation regarding how the chat window or other user interface windows operate.

FIG. 4 represents an exemplary law enforcement 14, 15 user interface 400 displayed on a law enforcement device 7, 8, 9. The user interface provides law enforcement personnel 14, 15 or vehicles 16 or other system user direct interaction with clearinghouse 1 through the various communication pathways as outlined in FIG. 1. The user interface discussed in FIG. 4 is exemplary. A person of skill in the art will recognize layout and design variation such as shifting the position of the overlap map, placement of the chat window, or user query request fields. Clearinghouse 1 applications residing on the law enforcement device 7, 8, 9 as outlined in FIG. 2 permit customization of a law enforcement 14, 15 user interface and content illustrated in FIG. 4 or not illustrated in FIG. 4 may be added or deleted.

A query request window 410 on the law enforcement 14, 15 user interface 400 permits text based entry into associated fields on the application running on a law enforcement device 7, 8, 9, Queries define how Clearinghouse 1 will interact and respond to law enforcement 14, 15 or other system users. Law enforcement 14, 15 may use the query request window 410 to query Clearinghouse 1 to determine the current or past location of an offender 5 in relation to the subscriber 6 current location or the location of the requesting law enforcement 14, 15 personnel. Law enforcement 14, 15 may query Clearinghouse 1 based on subscriber 6 location 411, offender 5 location 412, offender 5 demographic information 413, offender 5 sentencing guidelines 414, and offender 5 location trend information 415. Fields illustrated in the query request user interface 410 or not illustrated may vary and permutations will be apparent to one of skill in the art. The query request window 410 also includes a field where law enforcement personnel 14, 15 may define notifications and alerts 416 to Clearinghouse 1 and how responses should be received. As an example, law enforcement 14, 15 inputs text into the notification and alert field 416 regarding the distance that an offender 5 should be from subscriber 6 before a notification is sent to a law enforcement device 7, 8, 9. Law enforcement 14, 15 may input into the notification and alert field 416 that when an offender 5 is less than 50 meters from subscriber 6, clearinghouse 1 should generate an email notification to the law enforcement 14, 15.

Responses to user generated queries are displayed in a query response window 420 and/or an overlap map 430 on the user interface 400. Definition as to where a response will be displayed may be defined by law enforcement personnel in the notification and alert 416 field of the query request window 410. In the query response window 420, text based messages will be displayed in response to the law enforcement 14, 15 personnel query. As an example, law enforcement 14, 15 inputs the subscriber 6 current location as Chile, Wis., into the query request field 411 and executes the search on the application. Law enforcement 14, 15 may input subscriber 6 location as a city with a state, a zip code, or as GPS coordinates, Clearinghouse 1 would analyze the location, demographic, sentencing guidelines, and trending information of offenders 5 within a predetermined distance of the subscriber 6 location as defined in FIG. 5. Clearinghouse 1 then transmits the information to a law enforcement device 7, 8, 9 and the information will be displayed in the query response window 420, Information displayed in the query response window 420 may display the name and gender of the offender 5, such as Joe Smith, Male, 70 kg along with sentencing or trend information including a frequency of how often offender 5 has visited their current location, Query response window 420 may also display a photograph, or any other desired information relating to offender 5. As an example, trend information may be displayed in the query response window that Joe Smith has frequented his current location in Chile, Wis., three times per day since the first of the month, Clearinghouse 1 responses may also be presented in graphical format as shown in an overlap map 430, Icons 431 representative of subscriber 6, offender 5, law enforcement 14, 15 or vehicles 16, or other systems users will be displayed in the overlap map 430. Additional information about the subscriber 6 or offender 5 will be displayed in call out window 432 when law enforcement 14, 15 selects or moves over the icon 431 on the overlap map 430, Representation of icons and call out windows are exemplary in the user interface 400 and may assume the shapes of numerous symbols or banners. Variations on the design will be apparent to one of skill in the art upon reading the present disclosure.

Exemplary Work Flows

Figure 5:
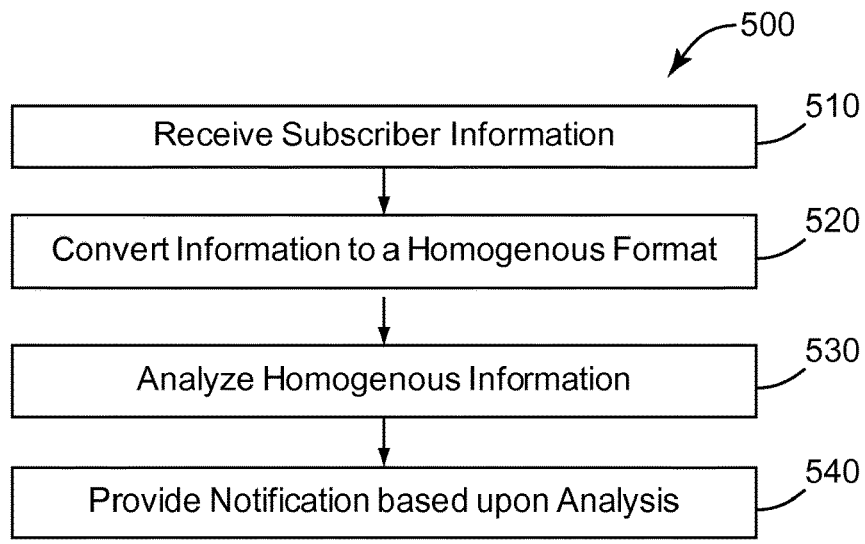
FIG. 5 illustrates an exemplary workflow for a clearinghouse.
Figure 6:
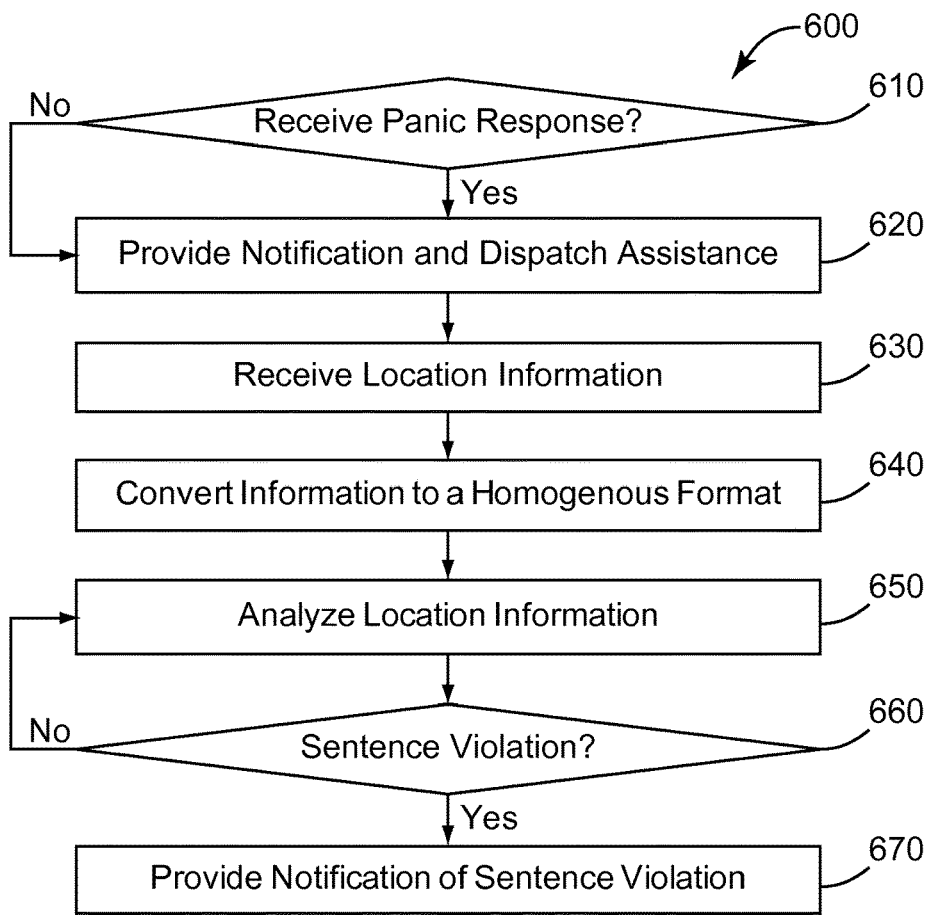
FIG. 6 illustrates an exemplary workflow for subscriber panic response.

FIGS. 5 and 6 depict various exemplary work flows associated with a clearinghouse consistent with the present disclosure. While the exemplary work flows show particular scenarios and ways in which a clearinghouse can interact with data, individuals, devices, and ways in which the clearinghouse can operate, permutations and variations on these examples will be apparent to one of skill in the art upon reading the present disclosure. The various steps and devices shown in and discussed in the context of each of the Figures can be adapted to meet other particular use cases and work flows. Further, steps and devices shown in the Figures may be combined in variety of ways; the Figures are only intended to illustrate a sampling of the possible processes and communication routes made possible by the present disclosure. Finally, as technology evolves, some of the processes or steps shown in the Figures may become unnecessary or obsolete; however, the scope of the inventive concepts disclosed and claimed herein will still be understood by those of skill in the art.

FIG. 5 represents an exemplary work flow 500 of subscriber 6 or other user interaction provided by clearinghouse 1 as shown in FIG. 1. The process outlined in FIG. 5 outlines an exemplary path through the tiered, clustered, and federated sub-networks 22, 26, 36 as identified in FIG. 2 in which a clearinghouse interacts with data, individuals, and devices. Permutations on these examples and the incorporation of evolving technology will be apparent to one of skill in the art upon reading the present disclosure. Not all steps may be required and in some instances, additional steps not illustrated in FIG. 5 may be performed by clearinghouse 1. Among other functions, clearinghouse 1 can receive, convert, analyze, store, notify, report, and overlay geospatial location and other defined information including: criminal records, demographic information, and sentence guidelines. Inclusion of other information will be apparent to one of skill in the art.

As shown in step 510 of FIG. 5, clearinghouse 1 first receives the subscriber 6 or other user information. Other users include, but are not limited to: law enforcement personnel 14, 15 and vehicles 16. Such information is geospatial location including time and date, movement, distance parameters, time periods, and queries or requests. Depending on the subscriber 6 device 7, 8, 9, or the other user providing information, clearinghouse 1 may receive information in different ways. For example, if the subscriber 6 is connected to clearinghouse 1 through an interface on the subscriber laptop computer 9, then real time or historic information may be received by clearinghouse 1 via a wired 39 or wireless 11, 12 internet 2 connection. Information received by clearinghouse 1 may include geospatial location as 38°24'19.45" N 122°6'2.34" W, movement defined as a direction and a velocity as 20° North of West at 1.4 m/s, and a query to determine where the closest offender 5 is located. Clearinghouse 1 may receive information from multiple subscribers in multiple formats through multiple communication paths. Variations of subscriber connections, information format, and communication paths will be apparent to one of skill in the art.

Subscribers 6 or other system users interact with clearinghouse 1 through an application interface on the subscriber 6 device 7, 8, 9. The interface is displayed to the subscriber 6 through a liquid crystal display, touch screen, or the like on the subscriber device 7, 8, 9. Subscriber 6 or other user interfaces permit information entry into a field on the subscriber device 7, 8, 9 that are received by clearinghouse 1 as queries, requests, or panic responses. Interfaces may be unique to the system user as the subscriber 6 interface may differ in layout from a law enforcement 15 layout as was shown in FIG. 3 and FIG. 4. Subscriber 6 queries may include but are not limited to other system user demographic information, geospatial location, movement, proximity to subscriber 6, sentence guidelines, or trend information. The subscriber 6 may also use the clearinghouse 1 as navigation and query to determine the location of the subscriber 6 in relation to a fixed geospatial location. As an example, subscriber 6 may input a query into the application interface of the subscriber laptop computer 9 for clearinghouse 1 to determine and respond with the location of the closest offender 5. Subscribers 6 and other systems users may use the application interface to subscribe to receive notifications and updates from clearinghouse 1. Clearinghouse 1 may be configured to receive subscriber 6 information automatically or by command of the subscriber device 7, 8, 9. For example, subscriber 6 may input a request to clearinghouse 1 to receive notifications whenever offender 5 is within proximity to subscriber 6. Proximity may be defined by the subscriber 6 through the application interface as a time period or distance parameter or the user may accept clearinghouse 1 default minimum and maximum values. Subscriber 6 or other system user may accept clearinghouse 1 default settings or define their own through the application interface. Combinations of selected default and user defined settings with clearinghouse 1 will be apparent to one of skill in the art. A proximity query requires that clearinghouse 1 automatically receive subscriber 6 information to compare with offender 5 information. Clearinghouse 1 real time servers 29 as defined in FIG. 2 support real time functionality such as chat between the subscriber's 6 device 7, 8, 9 and E911 dispatch 70 and chat operators 71 for any help or assistance regarding interacting with clearinghouse 1. Reception of data by clearinghouse 1 may be facilitated via the monitoring of a standard internet service 220 as described in FIG. 2. Subscribers or other system users interact with the clearinghouse 1 through standard internet services 220 providing information in various formats (email, telephone, web applications or other file transfer protocols). Received information along with business logic services 230 that manage the standard internet service 220 as defined in FIG. 2 are stored for retrieval, updating, and/or archiving in clearinghouse 1 in clustered and federated database servers 37.

Once clearinghouse 1 receives subscriber 6 or other user location information as shown in step 510, clearinghouse 1 then converts the received information to a homogenous format as shown in step 520. The process of converting received information into a homogenous format enhances analysis and data comparison as defined in step 530. For example, based on the variation of pathways that clearinghouse 1 is able to receive information, and a system user transmits geospatial location information including date and time to clearinghouse 1. As one example of transmission of specific information, location information from subscriber 6 may be wirelessly transmitted through the subscriber device 7, 8, 9 and be received by the clearinghouse 1 as OPS coordinates of 38°24'19.45" N 122°6'2.34" W with a date and time of 2011-09-23 16:41:28. In step 520, clearinghouse 1 through the use of business logic services 230 as defined in FIG. 2 converts subscriber 6 information into a homogenized format. Information is formatted from degrees-minutes-seconds to degrees-decimal minutes via the geospatial information server 28. Subscriber 6 information becomes 38°24.324' N 122°6.039' W with a date and time of 2011-09-23 16:41:28.

Homogenous information conversion within clearinghouse 1 may occur on single or multiple portions of the received information including but not limited to: geospatial location, time and date, demographic, queries or requests. Conversion may be accomplished through multiple format variations such as text to text, number to text, text to number, or embedded text in an image to text. Variations and permutations will be apparent to one of skill in the art. Converted information is stored in clustered and federated databases 37 as defined in FIG. 2 for further analysis.

In step 530, clearinghouse 1 analyzes and compares homogenous information through the use of the tiered server architecture. Business logic services 230 and the clustered and federated database servers 37 as described in FIG. 2 provide reliable and optimal assessment of homogenous information based upon user or system specific application procedures. As was captured in step 310, subscriber 6 or other user location information, queries, requests, demographic, and notification procedures are received by clearinghouse 1. For example, the subscriber 6 may define a query through the application interface to clearinghouse 1 to notify the subscriber 6 when an offender 5 is in proximity. Clearinghouse 1 accesses and analyzes received offender 5 location and movement in relation to the location and movement of subscriber 6 as defined in FIG. 2, Analysis may be graphical where overlay images of the offender 5 and the subscriber 6 are compared. Clearinghouse 1 may also analyze subscriber 6 and offender 5 trends. If clearinghouse 1 determines that offender 5 has been or is in continual proximity to subscriber 6, then notification messages will be generated as outlined in step 540. When the offender 5 is in proximity of subscriber 6, clearinghouse 1 will respond with notification as outlined in step 540. Variations of comparing multiple offenders 5 to the subscriber 6 location and trend analysis will be apparent to one of skill in the art.

Based upon analytical conditions and results, clearinghouse 1 provides notification to system users as shown in step 540, Supervising agencies 3, contracted companies 4, law enforcement personnel 14, 15 and vehicles 16, and subscribers 6 receive information related to violations from clearinghouse 1 in the form of notifications and reports. Offender 5 violations may be defined by system users as real-time offender 5 criminal activity or trend reports that describe criminal historic behavior or suspected activities, Notifications may be transmitted in real-time or are sent when requested by system users. Upon meeting the conditions of a violation that are received, converted, and defined by the subscriber 6 or other system user, clearinghouse 1 transmits a notification to the subscriber via processes outlined in the business logic service 230 in FIG. 2. For example, subscriber 6 defines a query through the application interface to be notified by clearinghouse 1 of location, criminal record, and demographic details when offender 5 is in proximity of subscriber 6. Upon analysis and determining that offender 5 is in proximity, clearinghouse 1 through processes outlined in FIG. 2 transmits an email notification with a graphical overlay image to subscriber laptop computer 9 that contains offender 5 demographic and location information including name and criminal record as well as movement in relation to the subscriber 6. Notification messages may be transmitted in predefined time periods such as less than one minute from determining an offender 5 is within predefined proximity to subscriber 6. Notifications may also be transmitted on a recurring schedule basis such as every 24 hours. Variations of the time periods will be apparent to one of skill in the art.

Notifications may be transmitted directly to the subscriber tracking device 7, 8, 9 in textual format via SMS or email, graphically as maps or overlay images, streaming media by voice or video chatting, or through other communication conduits apparent to one of skill in the art. Graphical maps and overlay images may provide additional interaction with respect to offenders 5 or other system users. As an example, a map may contain icons representing the location of the offender 5 and the subscriber 6. Selecting an icon provides additional information associated with the offender 5 or other system user including demographic details, sentence guidelines, or geospatial location coordinates including date and time, Violation information may be transmitted to supervising agencies 3, contracted companies 4, law enforcement personnel 14, 15 and vehicles 16 directly through the clearinghouse 1 via the internet 2 or telephone correspondence, Notifications may consist of offender 5 location, criminal record or activity, sentencing guidelines, or other demographic information as specific or requested. Variation and permutations of notification format will be apparent to one of skill in the art. Clearinghouse 1 enables multiple supervising agencies 3, contracted companies 4, or law enforcement personnel 14, 15 connected to clearinghouse 1 to share information including violations and notifications among other criminal justice or law enforcement agencies and companies.

Notifications may also be sent to law enforcement personnel 15 or vehicles 16 near the location of the offender 5 violation for assessment. For example, clearinghouse 1 reports a violation on offender 5 based upon subscriber 6 received information. Contained within the received information is instruction to notify law enforcement when the defined violation occurs, Clearinghouse 1 will determine and compare the location of offender 5 with law enforcement personnel 15 or vehicles 16. Notification will be transmitted to law enforcement personnel 15 or vehicles 16 that are closest to offender 5 through text message, email, or voice.

FIG. 6 represents an exemplary work flow 600 of subscriber 6 panic response provided by clearinghouse 1 as shown in FIG. 1. The process outlined in FIG. 4 outlines an exemplary path through the tiered, clustered, and federated sub-networks 22, 26, 36 as identified in FIG. 2 in which a clearinghouse interacts with data, individuals, and devices, Permutations on these examples and the incorporation of evolving technology will be apparent to one of skill in the art upon reading the present disclosure. Not all steps may be required and in some instances, additional steps not illustrated in FIG. 6 may be performed by clearinghouse 1. Among other functions, clearinghouse 1 receives, converts, analyzes, stores, notifies, reports, and overlays geospatial location and other defined information including: criminal records, demographic information, and sentence guidelines. Inclusion of other information be apparent to one of skill in the art.

As shown in step 610 of FIG. 6, clearinghouse 1 awaits the reception of a panic response or alert from subscriber 6 or other system user. A panic response or alert may be the generated as a consequence of subscriber 6 receiving offender 5 violation or trend notification messages as described in FIG. 5. Panic responses may be associated to an individual or multiple offenders 5. As an example, subscriber 6 queried clearinghouse 1 to provide notification when offender 5 who may have been involved in previous criminal activity with subscriber 6 is within proximity. If clearinghouse 1 receives, analyzes, and compares information from offender 5 and subscriber 6 and determines that offender 5 is close or, in proximity, to subscriber 6, then a notification will be transmitted to subscriber 6 with offender 5 information including location, demographic, and sentence guidelines. As a result of receiving the notification message, subscriber 6 will send a panic response to clearinghouse 1. If a panic response is received, clearinghouse 1 will provide notification and dispatch assistance to subscriber 6 as defined in step 620. If a panic response is not received, clearinghouse 1 will continue to receive subscriber 6 and offender 5 information as outlined in step 630 and monitor for a panic response to occur.

In step 620, clearinghouse 1 provides notification and dispatches assistance when a panic response or alert is received by subscriber 6 or other system user. Notification messages will be sent to the closest law enforcement personnel 14, 15 and vehicles 16, E911 dispatch 70, live chat operators 71, supervising agencies 3, contracted companies 4, parole and probation officers at supervising agencies 10, and parole officers 100. Along with the panic response, clearinghouse 1 receives subscriber 6 geospatial location including date and time, demographic, and contact information as defined in step 530 of FIG. 5. Subscriber 6 is notified by clearinghouse 1 through the subscriber device 7, 8, 9 that authorities 3, 4, 10, 14, 15, 16, 100 have been notified. A confirmation number is uniquely generated by Clearinghouse 1 to identify and track when a notification of a panic response was received by the subscriber 6. The number will be transmitted and confirmed to E911 Dispatch 70, live chat operators 71 and law enforcement 14, 15 or other system users in response to the panic response of subscriber 6. When notification and contact with respect to the panic response has been completed, the confirmation number will be closed and will not be used again by Clearinghouse 1. The confirmation number is generated in the Application Server 28 as described in FIG. 2. Confirmation numbers are also used for tracking the passage of data throughout Clearinghouse 1 and are not limited to the panic response of the subscriber 6. As an example, Clearinghouse 1 receives a panic response by a subscriber 6 and generates the number 123456. Notification messages and communication between the subscriber 6 and other system users such as law enforcement 14, 15 will include the number 123456. The number may be highlighted in the query response window 330 of the subscriber 6 user interface 300 as outlined in FIG. 3 and the query response window 420 of the law enforcement 14, 15 user interface 400 as defined in FIG. 4. The subscriber 6 may also be provided with instructions connect with the nearest law enforcement 14 facilities and contact telephone numbers. Notification messages may include additional information and the format may be defined through the subscriber 6 application interface. Variations of notification message structure and communication paths will be apparent to one of skill in the art. Real time geospatial location including date and time request commands will be sent to the offender's 5 geospatial location device 17, 18, 19, 20 via the clearinghouse 1 and its interfaces to other geospatial location including date and time to supervising agencies 3 and contracted companies 4 in order to provide current geospatial locations for the offender 5. If local E911 dispatch 70 is available to the clearinghouse 1, then a message with the subscriber's 6 location including date and time, demographic and contact information will be sent to E911 dispatch 70 and live chat operators 71 connected to the clearinghouse 1. Offender 5 geospatial location including date and time and demographic information with sentence guidelines are also transmitted to E911 dispatch 70 and live chat operators 71. As an example, subscriber 6 sends a panic response to clearinghouse 1 after receiving a notification report that offender 5 is in close proximity, Clearinghouse 1 responds by receiving subscriber 6 location with a date and time, name, and contact info: illation as a phone number and offender 5 geospatial location including date and time and demographic information as outlined in step 530 of FIG. 5. A notification message is sent by clearinghouse 1 to E911 dispatch 70 and live chat operators 71 connect with the subscriber device 9 using the provided phone number informing subscriber 6 that E911 dispatch 70 has been notified. E911 dispatch 70 uses the notification message to contact the law enforcement 15 agency closest to the geospatial location of subscriber 6. The panic response with subscriber 6 and offender 5 information is sent to the law enforcement 15 agency by clearinghouse 1 to identify the subscriber 6 and offender 5 and provide further assistance. Clearinghouse 1 may be configured to automatically connect law enforcement 14, 15 to the subscriber device 7, 8, 9 upon reception of a panic response. As an example, clearinghouse 1 receives a panic response and subscriber 6 geospatial location including date and time, demographic, and contact information. E911 dispatch 70 will be notified and will transmit a message to law enforcement 14, 15 with subscriber contact information. A confirmation number will be sent by clearinghouse 1 to the subscriber 6 that law enforcement 14, 15 or other authority 3, 4, 10, 100 has been notified. Law enforcement 14, 15 or other authorities 3, 4, 10, 100 will connect directly to the subscriber device 7, 8, 9. The confirmation number will appear on communication messages relayed by Clearinghouse 1 between the subscriber 6 and law enforcement 14, 15 to specifically verify that the panic response was received, notification was processed, and assistance was provided. The confirmation number will be connected to the subscriber 6 and may be associated to historical data. The data can be accessed at a later point to analyze statistics, trending patterns, or the movement history of the subscriber 6. Concurrently filed application entitled "Released Offender Geospatial Location information Trend Analysis," Ser. No. 13/370,283 identifies and outlines trending and data analysis performed by Clearinghouse 1 and is incorporated herein by reference. Automatic connection to the subscriber device 7, 8, 9 results in direct notification that the panic response was received by clearinghouse 1, Automatic connection may also occur without subscriber 6 interaction. If clearinghouse 1 determines based on the criminal activity trends or a generated threat assessment of offender 5, law enforcement 14, 15 may be informed by clearinghouse 1 and automatically connect to subscriber device 7, 8, 9 to provide assistance. Live chat operators also may automatically connect to subscriber devices 7, 8, 9 upon reception and analysis of a panic response. Threat assessments are specifically connected to the offender 5 and numerically assign a perceived harm or behavioral indicator based upon trending or movement patterns in relation to the subscriber 6 or other system user. In general, a threat assessment level or indicator will be assigned to an offender 5 based upon a set of rules that determine whether repeated patterns or sentencing guidelines are being violated with respect to the geospatial location of the subscriber 6 or other system user. Threat assessment levels of the offender 5 may be identified in the query response window 330, icons 341, or call-out window 342 of the subscriber 6 user interface 300 as defined in FIG. 3. They would also appear in similar locations on the law enforcement 14, 15 user interface 400 as outlined in FIG. 4. As an example, a threat level of 0 may indicated in the query response window 330 of the subscriber 6 user interface 300 that there is no relation between the movement patterns of the offender 5 with respect to subscriber 6 and the proximity of their geospatial locations is coincidental. However, a threat level of 1 or 2, may indicate that the offender 5 is stalking or following subscriber 6 and Clearinghouse 1 would notify subscriber 6 or nearby law enforcement 14, 15 of potential harm. Multiple threat assessment levels may be identified and may dynamically change as the geospatial location information, including time date, of the offender 5 is compared against the geospatial location formation, including time date, of the subscriber 6. A related application (it TBD) specifically discusses threat assessment levels as designated by Clearinghouse 1 and is associated herein by reference.

As shown in step 630 of FIG. 6, clearinghouse 1 first receives the subscriber 6 or other user information. Other users include, but are not limited to: law enforcement personnel 14, 15 and vehicles 16. Such information is geospatial location including time and date, movement, distance parameters, time periods, and queries or requests. Depending on the monitoring device used by the offender 5, subscriber 6 device 7, 8, 9, or the other user providing data to clearinghouse 1, clearinghouse 1 may receive data in different ways. For example, if an offender 5 is wearing a criminal offender tracking device 20 with OPS and communication capabilities, the criminal offender tracking device 20 may be configured to connect directly to the clearinghouse 1. In such a situation, the device may transmit real time or historic geospatial information, including date and time, to the clearinghouse 1 via a wired or wireless connection. If an offender is wearing a criminal offender tracking device 20 with GPS capabilities, but is not connected to the clearinghouse, a supervisory agency 3 or contracted company 4 receiving data including geospatial location information from the criminal offender tracking device may transmit the information to the clearinghouse 1 via a wired or wireless connection. The information may be transmitted as historic or in real time. If an offender 5 or user does not have a tracking device with UPS capabilities, the offender may be required to directly inform a supervising agency 3, contracted company 4, or other user of historic or real time geospatial location information, including date and time information. In that instance, the supervising agency 3, contracted company 4, or other user may then provide such information directly to the clearinghouse 1. System users not wearing tracking devices may directly interact with clearinghouse 1 through the use of cellular phones 8, laptop computers 9, personal digital assistants (PDA) 7, or other personal communication devices. For example, if the subscriber 6 is connected to clearinghouse 1 through an interface on the subscriber laptop computer 9, then real time or historic information may be received by clearinghouse 1 via a wired 39 or wireless 11, 12 internet 2 connection. Information received by clearinghouse 1 may include geospatial location as 38°24'19.45" N 122°6'2.34" W, movement defined as a direction and a velocity as 20° North of West at 1.4 m/s, and a query to determine where the closest offender 5 is located. Clearinghouse 1 may receive information from multiple subscribers in multiple formats through multiple communication paths. Variations of subscriber connections, information format, and communication paths will be apparent to one of skill in the art.

Subscribers 6 or other system users interact with clearinghouse 1 through an application interface on the subscriber 6 device 7, 8, 9. The interface is displayed to the subscriber 6 through a liquid crystal display, touch screen, or the like on the subscriber device 7, 8, 9. Subscriber 6 or other user interfaces permit information entry into a field on the subscriber device 7, 8, 9 that are received by clearinghouse 1 as queries, requests, or panic responses. Interfaces may be unique to the system user as the subscriber 6 interface may differ in layout from a law enforcement 15 layout as shown in FIG. 3 and FIG. 4. Subscriber 6 queries may include but are not limited to other system user demographic information, geospatial location, movement, proximity to subscriber 6, sentence guidelines, or trend information. As an example, subscriber 6 may input a panic response into the application interface of the subscriber laptop computer 9 for clearinghouse 1 in response to a notification message that offender 5 is in proximity to subscriber 6. The subscriber 6 may also use the clearinghouse 1 as navigation and query to determine the location of the subscriber 6 in relation to a fixed geospatial location. Clearinghouse 1 real time servers 29 as defined in FIG. 2 support real time functionality such as chat between the subscriber's 6 device 7, 9 and E911 dispatch 70 and chat operators 71 for any help or assistance regarding interacting with clearinghouse 1. Reception of data to clearinghouse 1 may be facilitated via the monitoring of a standard internet service 220 as described in FIG. 2. Subscribers or other system users interact with the clearinghouse 1 through standard internet services 220 providing information in various formats (email, telephone, web applications or other file transfer protocols). Received information along with business logic services 230 that manage the standard internet service 220 as defined in FIG. 2 are stored for retrieval, updating, and/or archiving in clearinghouse 1 in clustered and federated database servers 37.

Once clearinghouse 1 receives subscriber 6 or other user location information as shown in step 630, clearinghouse 1 then converts the received information to a homogenous format as shown in step 640. The process of converting received information into a homogenous format enhances analysis and data comparison as defined in step 650. For example, based on the variation of pathways that clearinghouse 1 is able to receive information, a system user transmits geospatial location information including date and time to clearinghouse 1. As one example of transmission of specific information, location information from subscriber 6 may be wirelessly transmitted through the subscriber device 7, 8, 9 and be received by the clearinghouse 1 as GPS coordinates of 38°24'19.45" N 122°6'2.34" W with a date and time of 2011-09-23 16:41:28. In step 640, clearinghouse 1 through the use of business logic services 230 as defined in FIG. 2 converts subscriber 6 information into a homogenized format. Information is formatted from degrees-minutes-seconds to degrees-decimal minutes via the aeospatial information server 28. Subscriber 6 information becomes 38°24.324° N 122°6.039' W with a date and time of 2011-09-23 16:41:28.

Homogenous information conversion within clearinghouse 1 may occur on single or multiple portions of the received information including but not limited to: geospatial location, time and date, demographic, queries or requests. Conversion may be accomplished through multiple format variations such as text to text, number to text, text to number, or embedded text in an image to text. Variations and permutations will be apparent to one of skill in the art. Converted information is stored in clustered and federated databases 37 as defined in FIG. 2 for further analysis.

In step 650, clearinghouse 1 analyzes and compares homogenous information through the use of the tiered server architecture. Business logic services 230 and the clustered and federated database servers 37 as described in FIG. 2 provide reliable and optimal assessment of homogenous information based upon user or system specific application procedures. As was captured in step 630, subscriber 6 or other user location information, queries, requests, demographic, and notification procedures are received by clearinghouse 1. Information, including sentence guidelines, is received by clearinghouse 1 from the offender 5 who is associated with the panic response. For example, a panic response sent by subscriber 6 requires the analysis and comparison of subscriber 6 information in relation to offender 5 information, including sentence guidelines. Clearinghouse 1 accesses and analyzes received offender 5 location and movement in relation to the location and movement of subscriber 6 as defined in FIG. 2. Analysis may be graphical where overlay images of the offender 5 and the subscriber 6 are compared. Variations of comparing multiple offenders 5 to the subscriber 6 location will be apparent to one of skill in the art.

In step 660, clearinghouse 1 analyzes whether offender 5 geospatial location and movement relative to the subscriber 6 or another geospatial location violates sentence guidelines defined by a criminal justice authority 3, 4, 10, 100. If offender 5 violates a sentence guideline, then clearinghouse 1 provides notification to supervising agency 3, contracted company 4, law enforcement 14, 15, and/or subscriber 6 as defined in step 670. If offender 5 does not violate a sentence guideline, then clearinghouse 1 continues to analyze real time or historic offender 5 information as was defined in step 650. Supervising agencies 3, contracted companies 4, law enforcement personnel 14, 15 and vehicles 16, and subscribers 6 receive information related to violations from clearinghouse 1 in the form of notifications and reports. Offender 5 violations may be defined by system users as real-time offender 5 criminal activity or trend reports that describe criminal historic behavior or suspected activities. Notifications may be transmitted in real-time or are sent when requested by system users. Upon meeting the conditions of a violation that are received, converted, and defined by the subscriber 6 or other system user, clearinghouse 1 transmits a notification to the subscriber via processes outlined in the business logic service 230 in FIG. 2. For example, a panic response is received by clearinghouse 1 from subscriber 6 that offender 5 is within a defined proximity. As outlined in step 620, a notification message will be sent to dispatch assistance and live chat support to subscriber 6. Clearinghouse 1 will analyze, as defined in step 650, offender 5 and subscriber 6 information to determine in step 660 whether offender 5 is in violation of sentence guidelines. The subscriber 6 or other system user may also report a sentence guideline violation through the subscriber 6 or other user interface. The query along with offender 5 information is received by clearinghouse 1 and processed in step 660 to determine if a violation has occurred, if so, clearinghouse 1 provides notification to the criminal justice authority 3, 4, 10, 100 or multiple authorities monitoring offender 5. For example, subscriber 6 is at a location where children gather for a function and notices that a sentencing guideline for the offender 5 is that the offender 5 is not allowed to be at a location where there are children. The application in the subscriber's 6 device 7, 8, 9 allows the subscriber 6 to enter the current geospatial location, either address or current geospatial location on a map generated by the subscriber's 6 device 7, 8, 9, date, time and a description of the potential violation, Notification messages may be transmitted in predefined time periods such as less than one minute from determining an offender 5 is within predefined proximity to subscriber 6, Notifications may also be transmitted on a recurring schedule basis such as every 24 hours. Variations of the time periods will be apparent to one of skill in the art.

In step 670, clearinghouse 1 provides notification of queries, sentence violations, and other violations to supervising agencies 3, contacted companies 4, subscribers 6, law enforcement 14, 15 and vehicles 16, parole officers 10, and parole and probation officers at supervising agencies 100, Notifications may be transmitted directly to the subscriber tracking device 7, 8, 9 in textual format via SMS or email, graphically as maps or overlay images, streaming media by voice or video chatting, or through other communication conduits apparent to one of skill in the art. Graphical maps and overlay images may provide additional interaction with respect to offenders 5 or other system users. As an example, a map may contain icons representing the location of the offender 5 and the subscriber 6, Selecting an icon provides additional information associated with the offender 5 or other system user including demographic details, sentence guidelines, or geospatial location coordinates including date and time. Panic response or sentence guideline reporting may be initiated from the overlay map or image by selecting the offender 5 icon. Violation information may be transmitted to supervising agencies 3, contacted companies 4, law enforcement personnel 14, 15 and vehicles 16 directly through the clearinghouse 1 via the internet 2 or telephone correspondence. Notifications may consist of offender 5 location, criminal record or activity, sentencing guidelines, or other demographic information as specific or requested. Variation and permutations of notification format will be apparent to one of skill in the art. Clearinghouse 1 enables multiple supervising agencies 3, contacted companies 4, or law enforcement personnel 14, connected to clearinghouse 1 to share information including violations and notifications among other criminal justice or law enforcement agencies and companies.

Notifications may also be sent to law enforcement personnel 15 or vehicles 16 near the location of the offender 5 violation for assessment. For example, clearinghouse 1 reports a violation on offender 5 based upon subscriber 6 received information. Contained within the received information is instruction to notify law enforcement when the defined violation occurs. Clearinghouse 1 will determine and compare the location of offender 5 with law enforcement personnel 15 or vehicles 16, Notification will be transmitted to law enforcement personnel 15 or vehicles 16 that are closest to offender 5 through text message, email, or voice.

Although the present disclosure has been described with reference to preferred embodiments, those of skill in the art will recognize that changes may be made in form and detail without departing from the spirit and scope of the present disclosure,

What is claimed is:

1. A computing device for communicating with a clearinghouse system that integrates geospatial information related to released criminal offenders, the computing device comprising:
   a processor;
   a display device; and
   a memory comprising instructions that when executed by the processor cause the processor to:
      in response to receiving an input from a user of the computing device, send by the processor a request to a clearinghouse system that configures a subscription based on one or more criteria related to at least one monitored criminal offender of a plurality of monitored criminal offenders, wherein the clearinghouse system maintains monitoring data related to offender monitoring devices of the plurality of monitored criminal offenders, the monitoring data comprising geospatial information, date and time information corresponding to the geospatial information, and at least one of demographic or sentencing information corresponding to the plurality of monitored criminal offenders;
      determine by the processor a current location of the computing device;
      send by the processor the current location of the computing device to the clearinghouse system;
      receive by the processor in real time from the clearinghouse system, configured to analyze a current location of a tracking device worn by the at least one monitored criminal offender relative to the current location of the computing device, a notification indicating the at least one monitored criminal offender is proximate to the current location of the computing device;
      responsive to receiving the notification by the processor indicating that the at least one monitored criminal offender is proximate to the current location of the computing device:
         output, for display at the display device, a graphical representation of the notification that includes one or more graphical icons associated with a respective monitored criminal offender of the at least one monitored criminal offenders; and
         responsive to receiving a user input selecting a graphical icon of the one or more graphical icons, output, for display at the display device, additional information for the monitored criminal offender associated with the selected graphical icon; and
      receive by the processor, a push notification. pushed from the clearinghouse system to the computing device, in response to the clearinghouse system assessing a trend or threat level of a released criminal offender from the plurality of monitored criminal offenders based on cumulative queries by the user to the clearinghouse system,
      wherein the clearinghouse system does not actively track a location of the computing device of the user.

2. The computing device of claim 1, wherein the memory comprises instructions that when executed by the processor cause the processor to:

generate for display at the display device, a user interface that includes a field through which a user can submit a one-time query.

3. The computing device of claim 1, wherein the memory comprises instructions that when executed by the processor cause the processor to interface with an emergency dispatch center.

4. The computing device of claim 1, wherein the memory comprises instructions that when executed by the processor cause the processor to generate for display at the display device, a user interface that allows a user to communicate with a live chat operator.

5. The computing device of claim 1, wherein the memory comprises instructions that when executed by the processor cause the processor to generate, for display at the display device, a subscription user interface that allows a user to subscribe to receive regular updates or notifications from the clearinghouse, wherein the user input is received while the display device displays the subscription user interface.

6. The computing device of claim 1, wherein the instructions cause the processor to automatically send the current location of the computing device to the clearinghouse.

7. The computing device of claim 1, wherein the one or more criteria include a given proximity to the computing device.

8. The computing device of claim 1, wherein the additional information includes at least one of: location trend information or domicile information.

9. The computing device of claim 1, wherein the additional information includes a movement history for the criminal offender over a range of dates or times.

10. The computing device of claim 1, wherein the graphical representation of the notification includes a map and wherein each graphical icon of the one or more graphical icons includes a respective icon representing a location of a respective monitored criminal offender on the map.

11. The computing device of claim 1, wherein graphical representation of the notification includes a panic alert button, and wherein the instructions further cause the processor to output a panic alert associated with one of the monitored criminal offenders in response to receiving a user input selecting the panic alert button.

12. The computing device of claim 11, wherein the memory comprises instructions that when executed by the processor cause the processor to send the panic alert to one of: a criminal justice agency, a law enforcement facility, a live chat operator, or an emergency dispatch operator.

13. The computing device of claim 11, wherein the instructions further cause the processor to send demographic or geospatial information, including date and time information, to the clearinghouse when the user submits the panic alert.

14. The computing device of claim 13, wherein the clearinghouse is configured to send the demographic or geospatial information to a law enforcement agency.

15. The computing device of claim 11, wherein the instructions further cause the processor to send the panic alert to a law enforcement agency in response to receiving a user input activating the panic alert.

16. The computing device of claim 15, wherein the computing device is configured to receive a confirmation number from the law enforcement agency.

17. The computing device of claim 15, wherein the instructions further cause the processor to automatically connect to the law enforcement agency in response to receiving a user input activating the panic alert.

18. The computing device of claim 1, wherein the graphical representation of the notification includes a location and contact information for the closest law enforcement facility.

19. The computing device of claim 1, wherein a law enforcement. agency is automatically connected to the computing device based on a criminal activity trend analysis generated by the clearinghouse or based on a subscriber threat assessment generated by the clearinghouse.

20. The computing device of claim 1, wherein the computing device can communicate with an emergency dispatch center.

21. The computing device of claim 1, wherein the computing device is associated with a law enforcement person that is closest to the at least one monitored criminal offender, and wherein only the computing device, which is included in a plurality of computing devices associated with law enforcement personnel at different locations, receives the notification.

22. A method for a computing device to communicate with a clearinghouse system that integrates geospatial information related to released criminal offenders, the method comprising:
in a computing device comprising a processor, a memory, and a display device, displaying by the processor on the display device, a subscription user interface that allows a user to subscribe to receive regular updates or notifications from the clearinghouse;
receiving, by the processor and while the display device displays the subscription user interface, a user input at the subscription user interface;
responsive to receiving the user input at the subscription user interface, sending by the processor, a request to a clearinghouse system that configures a subscription based on one or more criteria related to at least one monitored criminal offender of a plurality of monitored criminal offenders, wherein the clearinghouse system maintains monitoring data related to offender monitoring devices of the plurality of monitored criminal offenders, the monitoring data comprising geospatial information, date and time information corresponding to the geospatial information, and at least one of demographic or sentencing information corresponding to the plurality of monitored criminal offenders;
determining by the processor, a current location of the computing device;
sending by the processor, the current location of the computing device to the clearinghouse system;
receiving, by the processor in real time from the clearinghouse system, configured to analyze a current location of a tracking device worn by the at least one monitored criminal offender relative to the current location of the computing device, a notification indicating the at least one monitored criminal offender is proximate to the current location of the computing device;
responsive to receiving the notification by the processor:
displaying, by the display device, a graphical representation of the notification that includes one or more graphical icons associated with a respective monitored criminal offender of the at least one monitored criminal offenders; and
responsive to receiving a user input selecting a graphical icon of the one or more graphical icons, displaying, by the display device, additional information for the monitored criminal offender associated with the selected graphical icon; and receiving by the processor, a push notification, pushed from the clearinghouse system to the computing device, in response to the clearinghouse system assessing a trend or threat level of a released criminal offender from the plurality of monitored criminal offenders based on cumulative queries by the user to the clearinghouse system,
  wherein the clearinghouse system does not actively track a location of the computing device of the user.

23. The method of claim 22, wherein the, graphical representation of the notification includes a panic alert button, the method further comprising:
  responsive to receiving a user input selecting the panic alert button, outputting, by the computing device, a panic alert associated with one of the monitored criminal offenders.

24. An application executed by a processor of a computing device for communicating with a clearinghouse system that integrates geospatial information related to released criminal offenders, the application causing the processor to:
  output by the processor, for display on a display device of the computing device, a subscription user interface that allows a user to subscribe to receive regular updates or notifications from the clearinghouse,
  receive by the processor, while the display device displays the subscription user interface, a user input at the subscription user interface;
  responsive to receiving the user input at the subscription user interface, send by the processor, a request to a clearinghouse system that configures a subscription based on one or more criteria related to at least one monitored criminal offender of a plurality of monitored criminal offenders, wherein the clearinghouse system maintains monitoring data related to offender monitoring devices of the plurality of monitored criminal offenders, the monitoring data comprising geospatial information, date and time information corresponding to the geospatial information, and at least one of demographic or sentencing information corresponding to the plurality of monitored criminal offenders;
  determine by the processor, a current location of the computing device;
  send by the processor, the current location of the computing device to the clearinghouse system;
  receive by the processor in real time from the clearinghouse system, configured to analyze a current location of a tracking device worn by the at least one monitored criminal offender relative to the current location of the computing device, a notification indicating the at least one monitored criminal offender is proximate to the current location of the computing device;
  responsive to receiving the notification by the processor, output by the processor for display on the display device, a graphical representation of the notification that includes at least one graphical icon associated with a respective monitored criminal offender of the at least one monitored criminal offenders; and
  receive by the processor a push notification, pushed from the clearinghouse system to the computing device, in response to the clearinghouse system assessing a trend or threat level of a released criminal offender from the plurality of monitored criminal offenders based on cumulative queries by the user to the clearinghouse system,
  wherein the clearinghouse system does not actively track a location of the computing device of the user.

25. The application of claim 24, wherein the application further causes the processor to:
  responsive to receiving a user input selecting a graphical icon of the at least one graphical icons, output by the processor, for display on the display device, additional information for the monitored criminal offender associated with the selected graphical icon.

26. The application of claim 24, wherein a graphical representation of the notification includes a panic alert button, and wherein the application further causes the processor to:
  responsive to receiving a user input selecting the panic alert button, output by the processor, a panic alert associated with one of the monitored criminal offenders.

* * * * *